US010458432B2

(12) United States Patent
Nasir et al.

(10) Patent No.: US 10,458,432 B2
(45) Date of Patent: Oct. 29, 2019

(54) TURBOCHARGER COMPRESSOR ASSEMBLY WITH VANED DIVIDER

(71) Applicant: Garrett Transportation I Inc., Torrance, CA (US)

(72) Inventors: Shakeel Nasir, Phoeniz, AZ (US); Hasham Hamzamiyan Chougule, Mumbai (IN); Amarnath Balu Rajan, Bangalore (IN)

(73) Assignee: Garrett Transportation I Inc., Torrance, CA (US)

( * ) Notice: Subject to any disclaimer, the term of this patent is extended or adjusted under 35 U.S.C. 154(b) by 199 days.

(21) Appl. No.: 15/497,186

(22) Filed: Apr. 25, 2017

(65) Prior Publication Data
US 2018/0306203 A1    Oct. 25, 2018

(51) Int. Cl.
| | | |
|---|---|---|
| F02B 33/44 | (2006.01) |
| F04D 29/44 | (2006.01) |
| F02C 6/12 | (2006.01) |
| F04D 17/10 | (2006.01) |
| F01D 9/04 | (2006.01) |
| F02C 7/08 | (2006.01) |

(Continued)

(52) U.S. Cl.
CPC ........... *F04D 29/444* (2013.01); *F01D 9/045* (2013.01); *F02C 6/12* (2013.01); *F02C 7/08* (2013.01); *F04D 17/105* (2013.01); *F04D 29/285* (2013.01); *F04D 29/4206* (2013.01); *F05D 2220/40* (2013.01)

(58) Field of Classification Search
CPC .... F04D 17/105; F04D 29/444; F04D 29/285; F04D 29/4206; F01D 9/045; F02C 6/12; F02C 7/08
See application file for complete search history.

(56) References Cited

U.S. PATENT DOCUMENTS

| | | | |
|---|---|---|---|
| 1,287,367 A | 12/1918 | Loewenstein | |
| 3,642,062 A * | 2/1972 | Edmaier | F28D 1/0358 165/125 |

(Continued)

OTHER PUBLICATIONS

Lei, Aerodynamics of a Centrifugal Compressor with a Double Sided Impeller, Proceedings of the ASME Turbo Expo 2011, GT2011-45215, Jun. 6-10, 2011, Vancouver, British Columbia, Canada (11 pages).

(Continued)

*Primary Examiner* — Hai H Huynh
*Assistant Examiner* — Gonzalo Laguarda
(74) *Attorney, Agent, or Firm* — Brian J. Pangrle

(57) ABSTRACT

A compressor assembly of a turbocharger can include a compressor housing that includes a compressor wheel space and a diffuser section that extends from the compressor wheel space to at least one volute; a dual-faced compressor wheel disposed at least in part in the compressor wheel space where the dual-faced compressor wheel includes a first compressor wheel face and a second compressor wheel face oriented back-to-back; and a diffuser section divider disposed at least in part in the diffuser section where the diffuser section divider includes a first side that defines in part a first diffuser that includes a first set of vanes associated with the first compressor wheel face and a second side that defines in part a second diffuser that includes a second set of vanes associated with the second compressor wheel face.

19 Claims, 12 Drawing Sheets

(51) Int. Cl.
    *F04D 29/28*    (2006.01)
    *F04D 29/42*    (2006.01)

(56)            References Cited

U.S. PATENT DOCUMENTS 4,530,639   A  *   7/1985   Mowill .................. F01D 5/043
                                                            415/102
    7,628,018   B2 *  12/2009   Mowill .................. F01D 5/043
                                                            415/102
    8,764,379   B2     7/2014   Lei et al.
 2012/0294703  A1 *  11/2012   Lei ....................... F04D 17/105
                                                              415/1
 2015/0050128  A1 *   2/2015   Roques ................ F04D 25/024
                                                            415/145

OTHER PUBLICATIONS

Pavesi, Impeller Volute and Diffuser Interaction, Design and Analysis of High Speed Pumps (pp. 6-1-6-28), Educational Notes, RTO-EN-AVT-143, Paper 6. Neuilly-sur-Seine, France: RTO. 2006. http://www.rto.nato.int/abstracts.asp. (29 pages).
Ford Motor Company, Advanced Boost System Development for High EGR Applications, Award No. DE-FC26-07-NT43280, Dec. 21, 2012 (104 pages).

* cited by examiner

US 10,458,432 B2

TURBOCHARGER COMPRESSOR ASSEMBLY WITH VANED DIVIDER

TECHNICAL FIELD

Subject matter disclosed herein relates generally to radial compressors.

BACKGROUND

Compressors are frequently utilized to increase output of an internal combustion engine. A turbocharger can include a compressor, which may be a radial compressor. As an example, such a compressor may be driven by a turbine wheel operatively coupled to a shaft that can rotatably drive the compressor or, for example, such a compressor may be driven by another mechanism such as, for example, an electric motor. Various examples of techniques, technologies, etc. described herein pertain to compressors.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
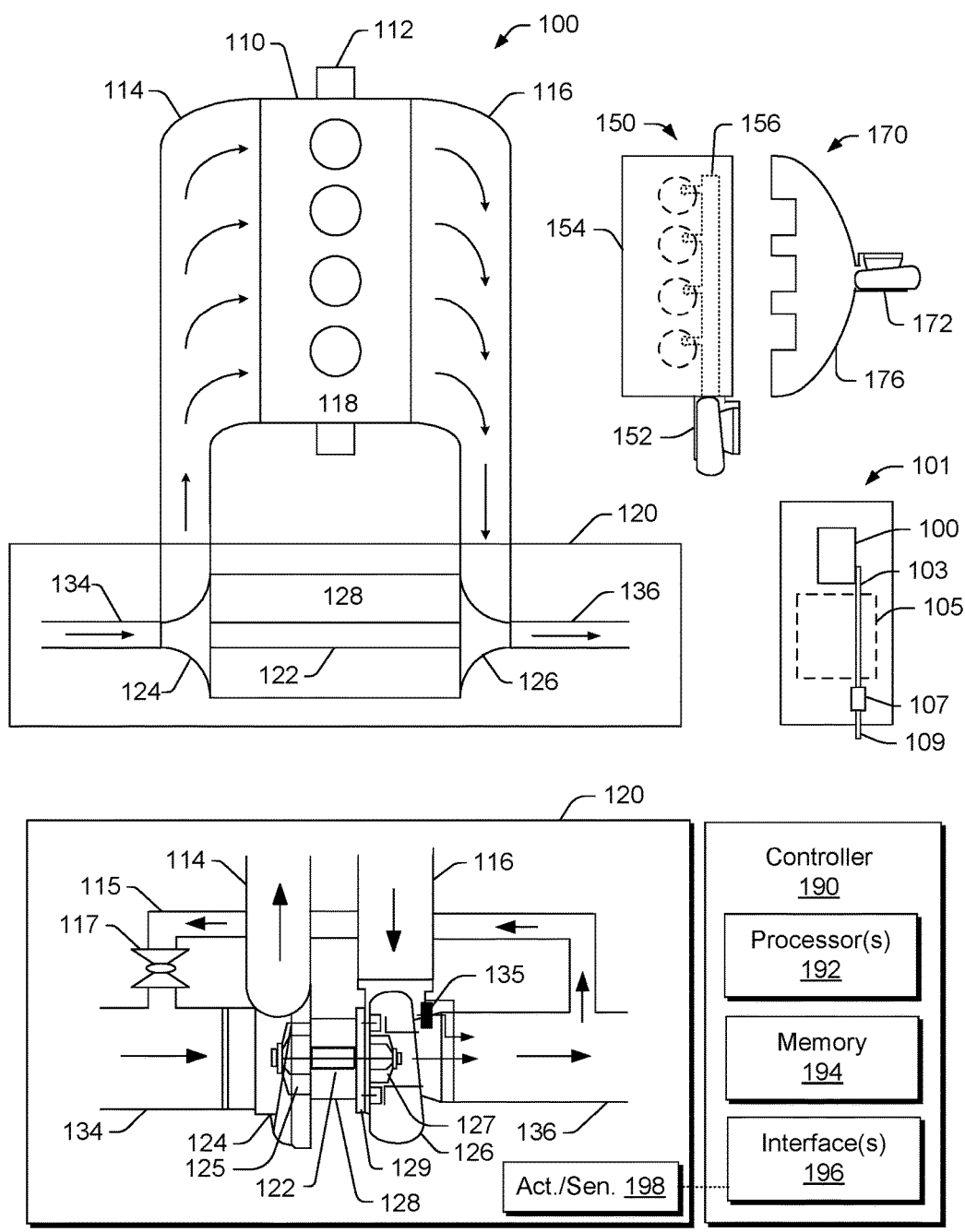
FIG. 1 is a diagram of an example of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

A dual-faced compressor wheel (e.g., a dual-faced compressor impeller) includes two bladed faces arranged in a back-to-back configuration, for example, with a common disk. A dual-faced compressor wheel can be cast and machined as a single component (i.e., a unitary piece) (see, e.g., the compressor assemblies 200 of FIG. 2 and 300 of FIG. 3).

Figure 12:
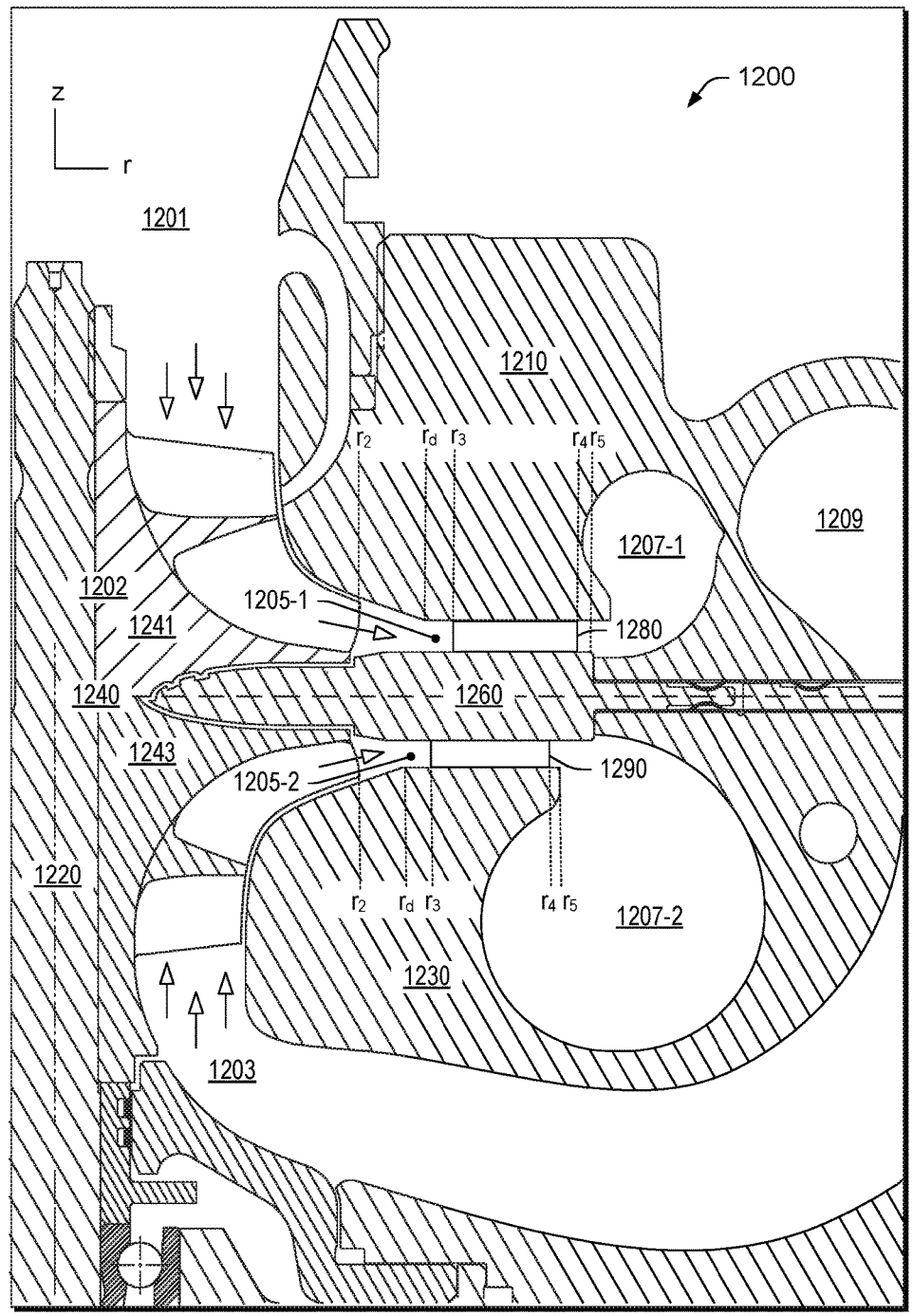
FIG. 12 is a cross-sectional view of an example of a multi-stage compressor assembly that includes a divider that includes vanes.

As another example, a dual-faced compressor wheel can be an assembly that includes two separate compressor wheels that are fit to a common shaft in a back to back arrangement (see, e.g., the compressor assembly 1200 of FIG. 12).

A compressor assembly can include a dual-faced compressor wheel with a single volute or can include dual-faced compressor wheel with a two separate volutes. As to the later, the two separate volutes can be volutes of a multi-stage compressor assembly where one volute receives fluid from one face of a dual-faced compressor wheel and includes an outlet conduit that directs fluid to an inlet of the other face of the dual-faced compressor wheel, which directs fluid to the other volute, which can include an outlet conduit that directs fluid to an intake manifold of an internal combustion engine.

As an example, a single-sequential turbocharger (SST) can utilize a dual-faced compressor wheel formed via one wheel casting that is driven by a common turbine shaft. In such an example, each face of the compressor wheel discharges into a common volute. As an example, a dual-faced compressor wheel (e.g., a compressor wheel assembly) can be formed from two separate single-faced compressor wheels that are driven by a single turbine shaft. In such an example, each wheel corresponds to a stage where a first-stage and second-stage arrangement can achieve higher boost pressures at lower turbine shaft speeds. Such a turbocharger may be referred to as a low speed turbocharger. In a multi-stage compressor assembly, a first-stage compressor wheel may be made of aluminum while a second stage compressor wheel may be made from titanium to better withstand higher heat from the first-stage during second-stage compression.

As to an SST, two faces of a single compressor wheel can share a common backwall, which defines a common diffuser space that leads radially to a common volute. In such an example, the two faces provide for flow in parallel. An SST may be utilized for high Brake Mean Effective Pressure (BMEP) engines that can have a wide speed range (e.g., consider turbo diesels used in light duty pickups, SUVs, and passenger cars). With flow in parallel, overall rotor mass and resultant moment of inertia may be reduced (e.g., by around 40 percent), which can directly affect turbo acceleration. As an example, for a SST, a choke to surge ratio may be about a 3:1 and efficiency gains may be in the range of about 10 percentage points.

A dual-faced compressor wheel can enable a single centrifugal compressor to have flow capacity similar to two compressors working in parallel but with a smaller packaging size. A dual-faced compressor can reduce inertia of a rotating group and can help to improve transient response. A smaller impeller diameter can also enhance turbine performance by improving compressor-turbine matching.

A compressor assembly with a dual-faced compressor wheel can include a common diffuser, a common volute and a common outlet. Such a compressor assembly may operate in two modes where one mode may be referred to as a parallel mode (e.g., more parallel in nature than the other mode). In the parallel mode, the two sides can operate under comparable conditions and the overall compressor can be behave in a manner akin to a compressor assembly that includes a single-faced compressor wheel. During operation, as an overall flow rate is reduced below a transition value, a transition occurs from the parallel mode to a single-compressor mode where one side experiences more flow than the other side. The side that flows more tends to operate away from a stability limit and the side with low flow tends to remain relatively stable if recirculation flow exists (e.g., recirculation flow with a ported shroud).

Figure 2:
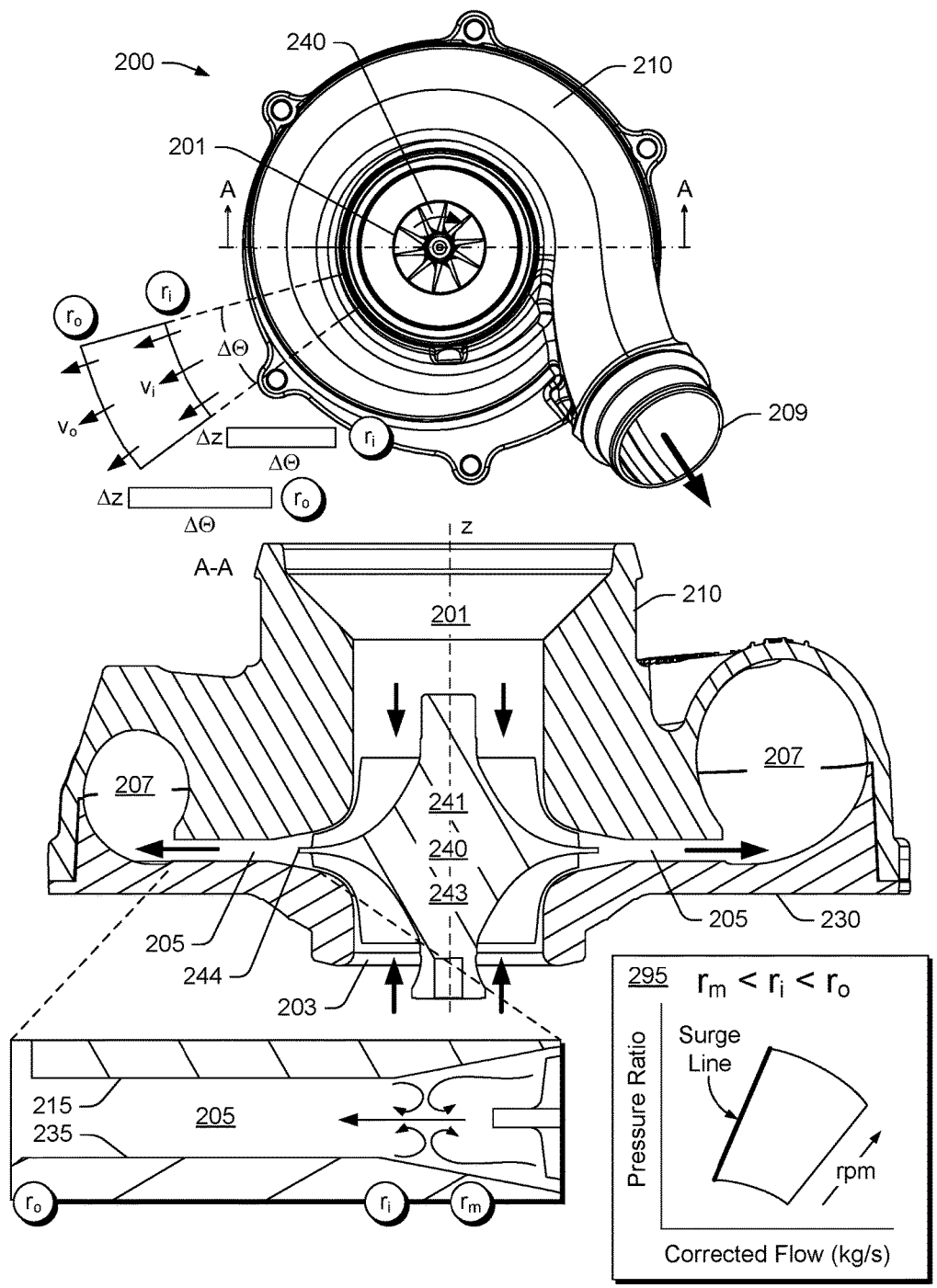
FIG. 2 is a top view and a cross-sectional view of an example of a compressor assembly along with a compressor map.

FIG. 2 shows an example of a compressor assembly 200 along with a plot 295. Specifically, FIG. 2 shows a top view, a cross-sectional view along a line A-A, and an enlarged view of a portion of the compressor assembly 200. The compressor assembly 200 includes a housing component 210, a housing component 230 and a wheel 240 with a face 241, a face 243 and an outer circumferential edge 244. An opening 201 of the housing component 210 provides for receipt of air (e.g., optionally mixed with exhaust) to an inducer portion of the face 241 and an opening 203 of the housing component 230 provides for receipt of air (e.g., optionally mixed with exhaust) to an inducer portion of the face 243. Upon rotation of the wheel 240, exducer portions of the faces 241 and 243 direct air to a diffuser section 205 and to a volute 207. In the example of FIG. 2, the housing components 210 and 230 define the volute 207, which is a common volute configured to receive air from the faces 241 and 243, while the housing component 210 defines a volute opening 209 (e.g., a discharge port).

As shown in the enlarged view, the diffuser section 205 is formed from a wall 215 of the housing component 210 and a wall 235 of the housing component 230. The diffuser section 205 may be considered as having a length extending between an inlet disposed at a radius $r_i$ and an outlet disposed at a radius $r_o$ (e.g., as measured from a central axis z). As shown in the top view, the cross-sectional area (see, e.g., $\Delta\Theta$ by $\Delta z$) of the diffuser section 205 is greater at the radius $r_o$ than at the radius $r_i$. Accordingly, velocity of air traveling in the diffuser section typically decreases with respect to increasing radius.

The enlarged view also shows a mixing radius $r_m$ where air streams from the two exducers can mix. In the example of FIG. 2, the mixing radius $r_m$ is less than the inlet radius $r_i$; therefore, at least some mixing occurs prior to the inlet of the diffuser section 205 (e.g., as defined by $r_i$). The plot 295 shows an operational envelope of pressure ratio versus corrected flow for various compressor wheel rotational speeds. The left hand side of the envelope is defined by a surge line, which as mentioned, represents a limit as to performance.

In the compressor assembly 200, flow to the face 241 and flow to the face 243 can be somewhat asymmetric for one or more reasons. For example, the face 241 may have a nose end while the face 243 may have a coupling end that includes a socket or other feature to operatively couple the wheel 240 to a shaft. As another example, consider one or more differences in the shape of the openings 201 and 203 and/or the shape of conduits where one conduit is in fluid communication with the opening 201 and another conduit is in fluid communication with the opening 203.

While a compressor with a dual-faced compressor wheel that includes an inward face and an outward face may be referred to as being a parallel compressor, for one or more reasons, inlet flow to the inward face tends to be not as uniform as inlet flow to the outward face. For example, in the example of FIG. 2, the inlet flow to the face 243 may not be as uniform as the inlet flow to the face 241. In FIG. 2, the opening 203 to the face 243 may be referred to as a rear inlet and may be in fluid communication with a shaped duct to guide flow to the opening 203 and the face 243 and, in FIG. 2, the opening 201 to the face 241 may be referred to as a forward inlet and may be in fluid communication with a relatively straight duct that can include a tapered section to provide for a more uniform flow to the face 241. Differing inlet flows lead to differing flows to a diffuser that extends radially from a wheel space for the dual-faced compressor wheel to a common volute. As shown in FIG. 2, the diffuser section 205 extends radially away from the z-axis (e.g., rotational axis of the compressor wheel 240) and to the volute 207.

As shown in FIG. 2, the diffuser section 205 may be defined by a radial dimension and an axial dimension where the axial dimension may vary with respect to radial distance from the z-axis and/or may be relatively constant over one or more radial spans. In the example of FIG. 2, the axial dimension of the diffuser section 205 is defined by the walls 215 and 235, which may be substantially parallel over at least a portion of the diffuser section 205 to define a relatively constant axial height. As shown in FIG. 2, the wall 215 can form a shoulder at the volute 207 while the wall 235 can transition to a curved portion that may cause flow in the volute 207 to form a vortex.

A volute of a centrifugal compressor is a space defined by a component or components (see, e.g., the housing components 210 and 230 of FIG. 2). A volute receives fluid being compressed by a compressor wheel and can slow down the fluid's velocity and recover static pressure. As shown in FIG. 2, the volute 207 is shaped as a curved funnel that increases in cross-sectional area as it approaches the volute opening 209.

As an example, a face of a compressor wheel can be defined by various parameters such as one or more of number of blades, inducer diameter, exducer diameter, exducer width (or exducer height along z-axis), and exducer blade angle. For example, a face of a compressor wheel can include about 10 blades, have an inducer diameter of about 45 mm, have an exducer diameter of about 65 mm, have an exducer width of about 3 mm, and include an exducer blade angle of about 25 degrees. As an example, a dual-faced compressor wheel may have an exducer height of about 5 mm or more (e.g., about 2.5 mm or more for one face and about 2.5 mm or more for another face).

To address diffuser flow, a compressor assembly can include vanes. For example, a disk can be positioned in a diffuser where one or both sides of the disk include vanes. Where a disk includes vanes on both sides, one or more features of the vanes of one side may differ from one or more features of the vanes of the other side. In such an example, vanes may be designed to enhance performance from each side of a compressor assembly that includes a dual-faced compressor wheel.

In a centrifugal compressor, a vaned diffuser can improve stage efficiency by turning flow direction from circumferential (e.g., due to rotation of faces) to more radial (e.g., to achieve a shorter flow path to a volute). As an example, a divider disposed in a common diffuser can define two diffuser sections, in general, one for each face of a dual-faced compressor wheel. In such an example, one or both diffuser sections can include vanes that can handle exit flow from one face or both faces separately and can help to reduce interactions between two different impeller exit flow fields.

As mentioned, depending on operational conditions, shapes/sizes of inlet conduits and impellers, etc., one impeller exit flow field may be different from another impeller exit flow field. As to operational conditions, consider differences due to single mode or parallel mode. As to components, shapes, sizes, etc. may differ between sides such that different impeller inlet flows exist (e.g., inlet flow field for the rear impeller may be different from the inlet flow field of the front impeller).

Reducing the interaction between two different impeller exit flow fields via a double-sided vaned diffuser divider can result in a reduction in mixing loss and/or aerodynamic blockage, which may improve stage stability and surge margin. Additionally, a double sided vaned diffuser divider may improve pressure recovery (Cp) and efficiency of the compressor stage due to de-swirling the flow over a smaller flow path in the vaned diffusion system.

As mentioned, one or more features of a front vaned diffuser (e.g., diffuser section) may be different from that of a rear vaned diffuser (e.g., diffuser section). A difference or differences may depend on relative velocity diffusion ratio through each impeller and exit flow field where, for example, a front vaned diffuser leading edge (LE) shape and angle may be different from a rear vaned diffuser LE shape and angle. In such an example, the blade angle and/or thickness distribution of the front diffuser vanes may be different from the blade angle and/or thickness distribution of the rear diffuser vanes. For an impeller with a higher relative velocity diffusion ratio, the absolute flow at the diffuser LE tends to become more tangential and thus the associated vane diffuser may be constructed for higher LE blade angle to reduce incidence loss.

As an example, a difference or differences may depend on the relative velocity diffusion ratio through each impeller and exit flow field, the radial gap between a front vaned diffuser LE and its impeller trailing edge (TE) may be different from those of a rear vaned diffuser LE and its impeller TE. In such an example, the L/W (diffuser length to width ratio) of the two diffusers may be different if the vaned diffuser exit radius is constant.

As another example, the solidity (solidity being equal to chord (c) divided by spacing (s)) of a front vaned diffuser throat may be different from the solidity of a rear vaned diffuser throat. In such an example, the solidity or the number of vanes for the front vanes may differ from the solidity or the number of vanes for the rear vanes. In an example, a solidity value or values may be in a range of from approximately 0.5 to approximately 1.0. As another example, a throat-to-capture area ratio (At/Ac) of a front vaned diffuser throat may be different from that of a rear vaned diffuser. In such an example, the throat-to-capture area ratio (At/Ac) for the front vanes may differ from throat-to-capture area ratio (At/Ac) for the rear vanes. In an example, a throat-to-capture area ratio (At/Ac) value or values may be in excess of approximately 1.05.

As an example, front and rear diffuser vanes may be symmetrically or asymmetrically imposed on each side of a divider (e.g., a divider disk) to reduce circumferential flow non-uniformity downstream of a diffuser (e.g., due in part to a volute) and its impact on upstream flow characteristics. As an example of asymmetric distribution, vanes may be more closely spaced near a tongue of a volute as compared to other circumferential locations (see, e.g., the example divider 360 of FIG. 6, which illustrates positions of two sets of vanes, one set on each side of the divider 360). A tongue of a volute is a region that is proximate to a divergent path toward an outlet of a volute. At the tongue the volute may be at its largest cross-sectional area to one side of the tongue and may be at its smallest cross-sectional area to the other side of the tongue.

While various examples refer to a compressor assembly that includes a common volute, a compressor assembly may include two volutes such that flow from one diffuser side is directed to one volute and flow from another diffuser side is directed to another volute (see, e.g., the compressor assembly 1200 of FIG. 12). A twin volute system may be symmetric or asymmetric, for example, depending on diffuser shape, size, and exit flow field. As an example, a twin volute compressor assembly may further improve stage stability and/or performance by reducing aerodynamic blockage and mixing losses (e.g., entropy gain) of flow downstream of diffuser(s).

Figure 3:
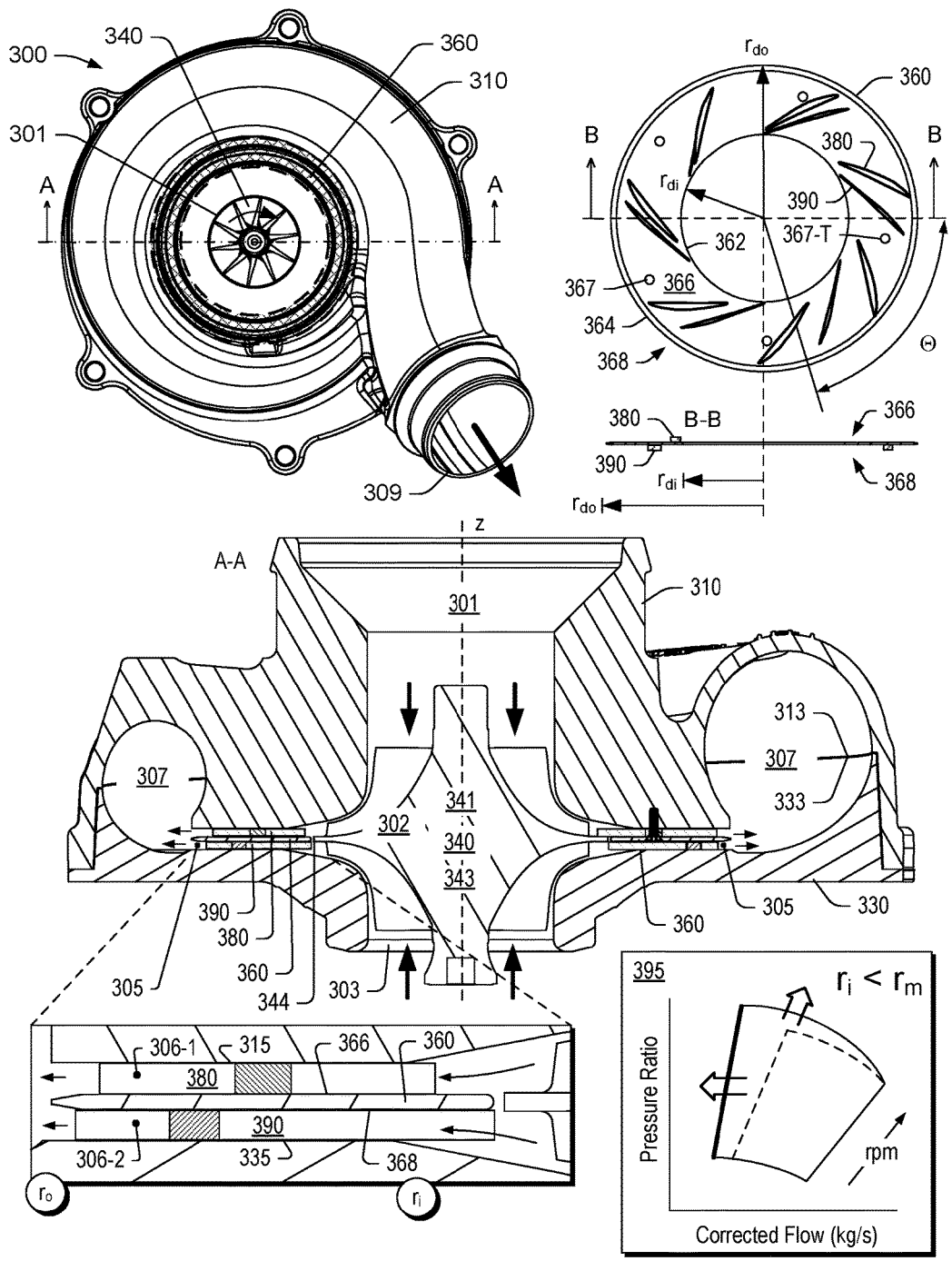
FIG. 3 is a top view and a cross-sectional view of an example of a compressor assembly along with a compressor map where the compressor includes a vaned diffuser divider.

FIG. 3 shows an example of a compressor assembly 300, an example of a divider 360 and a plot 395. Specifically, FIG. 3 shows a top view, a cross-sectional view along a line A-A, and an enlarged view of a portion of the compressor assembly 300 as well as a top view and a cross-sectional view along a line B-B of the divider 360, which includes a set of vanes or vanes 380 disposed to one side 366 of the divider 360 and includes a set of vanes or vanes 390 disposed to another, opposing side 368 of the divider 360. While the divider 360 is a solid piece of metal or alloy or other suitable material, the vanes 380 and the vanes 390 are shown in a see-through view that illustrates an example of number and positions of the vanes 380 and an example of number and positions of the vanes 390.

As shown in FIG. 3, the compressor assembly 300 includes a housing component 310, a housing component 330, the divider 360, and a dual-faced compressor wheel 340 with a first compressor wheel face 341, a second compressor wheel face 343 and an outer circumferential edge 344. An opening or inlet 301 of the housing component 310 provides for receipt of air (e.g., optionally mixed with exhaust) to an inducer portion of the face 341 and an opening or inlet 303 of the housing component 330 provides for receipt of air (e.g., optionally mixed with exhaust) to an inducer portion of the face 343. As shown, the housing components 310 and 330 form a compressor housing that defines a compressor wheel space 302 for a dual-faced compressor wheel where the compressor wheel space is disposed between the inlet 301 and the inlet 303.

Upon rotation of the dual-faced compressor wheel 340, exducer portions of the faces 341 and 343 direct air to a diffuser section 305 divided by the divider 360 and to a volute 307. In the example of FIG. 3, the housing components 310 and 330 define the volute 307, which in the example of FIG. 3 is a common volute configured to receive air from the faces 341 and 343, while the housing component 310 defines a volute opening 309 (e.g., a discharge port or outlet). In the example of FIG. 3, the housing component 310 includes a shoulder 313 and the housing component 330 includes a shoulder 333 where the shoulders 313 and 333 form a joint when the housing components 310 and 330 are assembled such that the housings components 310 and 330 define the volute 307.

As shown in the enlarged view, the diffuser section 305 is formed from a wall 315 of the component 310 and a wall 335 of the component 330. The diffuser section 305 may be considered as having a length extending between an inlet disposed at a radius $r_i$ and an outlet disposed at a radius $r_o$. As mentioned, velocity of air traveling in the diffuser section typically decreases with respect to increasing radius (e.g., due to increasing cross-sectional area).

In the example of FIG. 3, the divider 360 overlaps at least a portion of the length of the diffuser section where a leading edge is positioned proximate to the outer edge 344 of the wheel 340 and where a trailing edge may be positioned, for example, between the radii $r_i$ and $r_o$; noting that a trailing edge of the divider 360 may extend into the volute 307.

As shown in the enlarged view, air streams from the two exducers can be segregated into two different streams where one stream interacts with the set of vanes 380 and another stream interacts with the set of vanes 390. In the example of FIG. 3, mixing can occur in the volute 307, downstream of the diffuser section 305.

As shown in FIG. 3, the divider 360 includes the opposing sides 366 and 368 where the side 366 defines in part a first diffuser 306-1 and where the side 368 defines in part a second diffuser 306-2. For example, the side 366 and the wall 315 define the first diffuser 306-1 and the side 368 and the wall 335 define the second diffuser 306-2. As shown, the vanes 380 are disposed at least in part in the first diffuser 306-1 and the vanes 390 are disposed at least in part in the second diffuser 306-2. The vanes 380 and/or the vanes 390 may be operatively coupled to the divider 360, the wall 315 and/or the wall 335. For example, the vanes 380 and the vanes 390 may be mounted on the divider 360. As another example, the vanes 380 may be mounted on the wall 315 and the vanes 390 may be mounted on the wall 335 where the divider 360 may be mounted to the wall 315, the wall 335, one or more of the vanes 380 and/or one or more of the vanes 390.

The plot 395 shows an operational envelope of pressure ratio versus corrected flow for various compressor wheel rotational speeds. The left hand side of the envelope is defined by a surge line, which as mentioned, represents a limit as to performance. Dashed lines indicates the operational envelope for a compressor assembly such as the assembly 200 of FIG. 2 while a solid line indicates the improved operational envelope for a compressor assembly such as the assembly 300 of FIG. 3, which includes a divider with vanes.

Referring again to the top view of the divider 360, an inner divider radius $r_{di}$ and an outer divider radius $r_{do}$ are shown, which coincide with leading and trailing edges of the divider 360, respectively. An angle Θ is shown as defining a position of a mounting feature to mount the divider 360 to the component 310. As mentioned, to reduce circumferential non-uniformity and possibly high cycle fatigue (HCF), mounting features may be arranged asymmetrically or unevenly.

In the example of FIG. 3, the divider 360 can have a central axis (e.g., z-axis), a leading edge 362 disposed at an inner radius $r_{di}$ about the central axis, a trailing edge 364 disposed at an outer radius $r_{do}$ about the central axis, an upper surface 366 disposed between the leading edge 362 and the trailing edge 364, a lower surface 368 disposed between the leading edge 362 and the trailing edge 364 and one or more mounting features 367 configured to mount the divider 360 in a diffuser section configured to receive air compressed by two compressor wheel faces and to direct the compressed air to a volute. In the example of FIG. 3, one of the one or more mounting features 367 is labeled 367-T, which may be a mounting feature that is located closest to a tongue of the compressor assembly 300, which can be defined at least in part by the housing component 310. As an example, the tongue may correspond approximately to the line B-B on the right side of the divider 360.

In the example of FIG. 3, the number of individual vanes of the set of vanes 380 can differ from the number of individual vanes of the set of vanes 390. For example, the vanes 380 can include seven individual vanes while the vanes 390 can include six individual vanes. In the example of FIG. 3, the vanes 380 can be referred to as vanes associated with an outwardly directed compressor wheel face (e.g., the face 341) and the vanes 390 can be referred to as vanes associated with an inwardly directed compressor wheel face (e.g., the face 343). In FIG. 3, the opening 303 to the face 343 may be referred to as a rear inlet and may be in fluid communication with a shaped duct to guide flow to the opening 303 and the face 343 and, in FIG. 3, the opening 301 to the face 341 may be referred to as a forward inlet and may be in fluid communication with a relatively straight duct that can include a tapered section to provide for a more uniform flow to the face 341.

As shown in FIG. 3, the compressor assembly 300 is a compressor assembly of a turbocharger (see, e.g., the turbocharger 120 of FIG. 1) where the compressor assembly 300 includes: a compressor housing (e.g., a multi-component compressor housing that includes the housing component 310 and the housing component 330) that includes the compressor wheel space 302 (e.g., disposed between the inlets 301 and 303) and the diffuser section 305 that extends from the compressor wheel space 302 to at least one volute 307; the dual-faced compressor wheel 340 disposed at least in part in the compressor wheel space 302 where the dual-faced compressor wheel 340 includes the first compressor wheel face 341 and the second compressor wheel face 343 oriented back-to-back; and the diffuser section divider 360 disposed at least in part in the diffuser section 305 where the diffuser section divider 360 includes the first side 366 that defines the first diffuser 306-1 that includes the first set of vanes 380 associated with the first compressor wheel face 341 and the second side 368 that defines the second diffuser 306-2 that includes the second set of vanes 390 associated with the second compressor wheel face 343.

Figure 4:
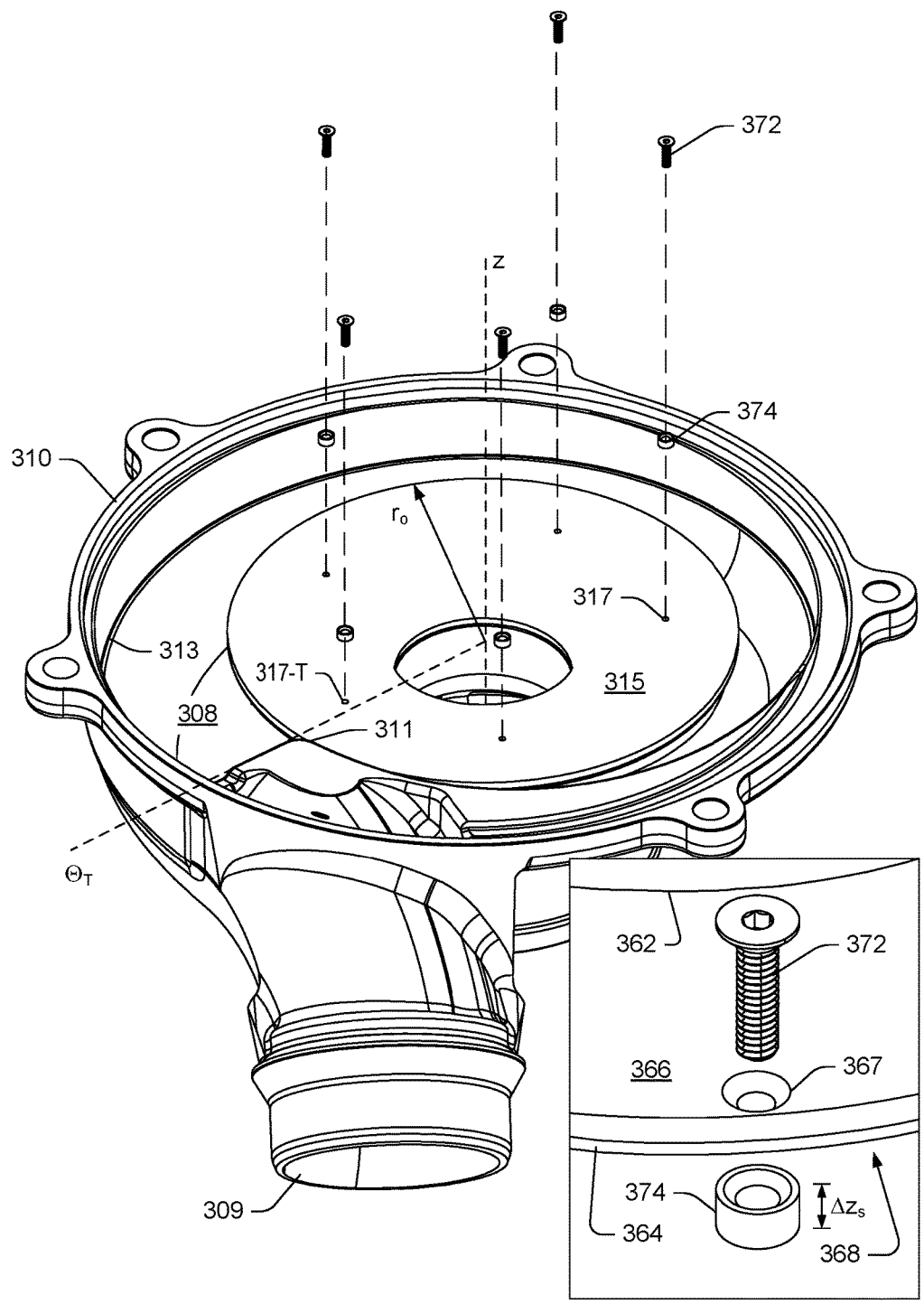
FIG. 4 is an exploded perspective view of various components of the compressor assembly of FIG. 3.

FIG. 4 shows views of various components of the assembly 300 of FIG. 3. In the example of FIG. 4, the housing component 310 includes various threaded openings 317 located along the diffuser wall 315. Mounting components include threaded bolts 372 and spacers 374. Each of the spacers 374 have an axial dimension $\Delta z_s$ to determine, at least in part, an axial position or axial spacing of the divider 360 with respect to the diffuser wall 315.

FIG. 4 shows a volute space 308 defined by the housing component 310 that forms the full volute 307 as shown in FIG. 3 when the housing component 310 is joined with the housing component 330. In FIG. 4, the shoulder 313 is shown that forms a joint with the shoulder 333 of the housing component 330.

FIG. 4 also shows a tongue 311 that is at a tongue angle $\Theta_T$, which may optionally define a 0 degree angle or origin of a cylindrical coordinate system as to coordinates r, z and Θ. In such an example, the divider 360 can be oriented with respect to the tongue 311 such that the vanes 380 and the vanes 390 are properly aligned with respect to the geometry of the volute 307. As to the threaded openings 317, a threaded opening labeled 317-T is closest to the tongue 311. As an example, the threaded opening 317-T may be aligned with the mounting feature 367-T as shown in FIG. 3 where the vanes 380 are disposed between the divider 360 and the housing component 310 and where the vanes 390 are disposed between the divider 360 and the housing component 330. As an example, the positions of the vanes 380 can be defined with respect to the tongue angle $\Theta_T$ and the positions of the vanes 390 can be defined with respect to the tongue angle $\Theta_T$.

In the example of FIG. 4, the one or more mounting features 367 of the divider 360 can be openings that can receive bolts 372. As an example, a vane may include an opening that can receive a bolt such that one or more of the spacers 374 may be eliminated. For example, vanes can be spacers where vane height may be a spacer height. As an example, one or more of the vanes 380 and/or one or more of the vanes 390 may be utilized to space the divider 360 in a diffuser (e.g., a diffuser section) of a compressor assembly that includes a dual-faced compressor wheel.

Figure 7:
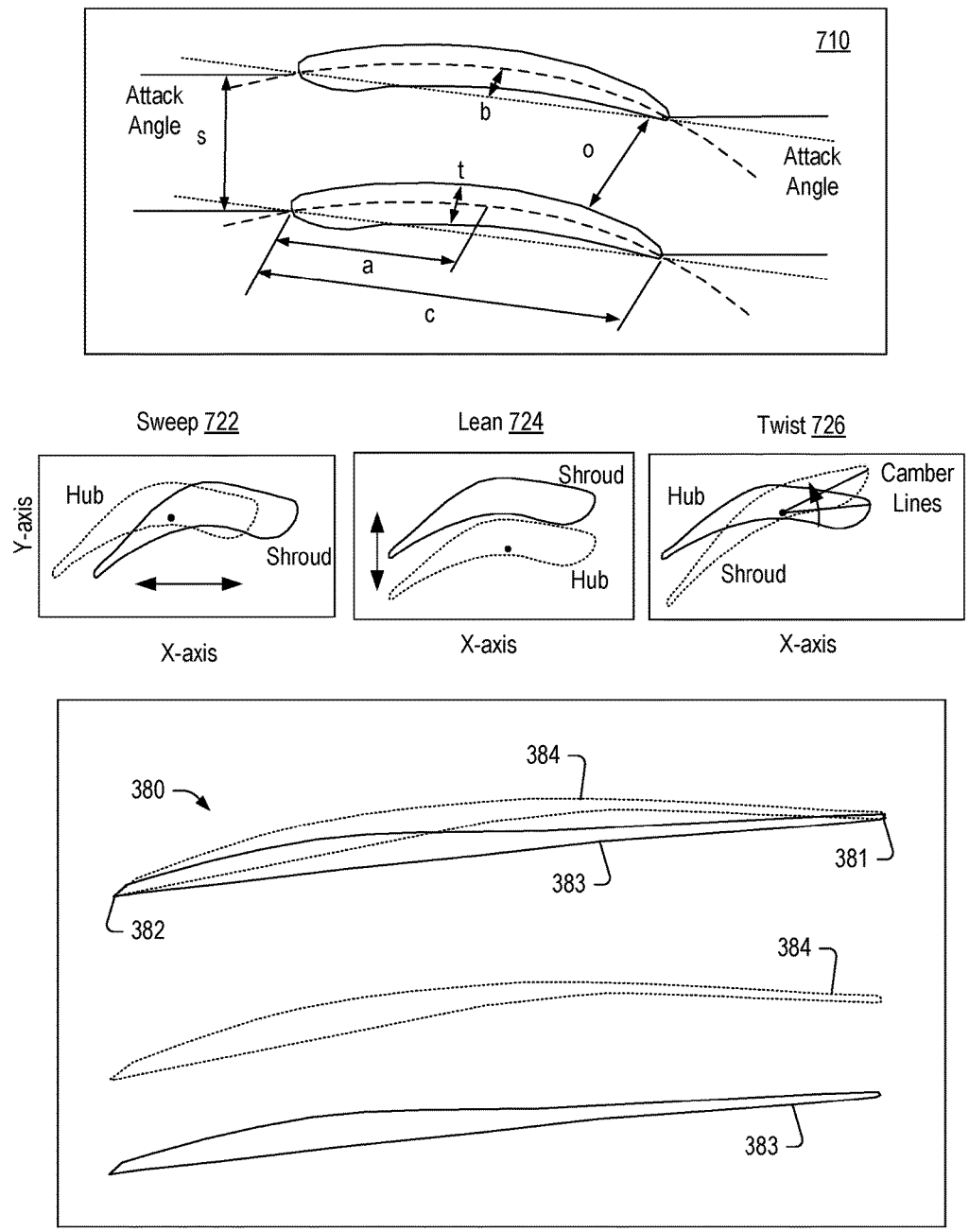
FIG. 7 is a series of views of examples of vane parameters and an example of a non-stacked vane.

As an example, vane aerodynamic performance may be defined in part by solidity, which is the ratio of chord (c) and spacing (s) (i.e., c/s; see also FIG. 7). The chord is defined as a straight line between leading and trailing edge of the vane and spacing is defined as $2\pi[(\text{radius}_{LE}+\text{radius}_{TE})/2]/$ number of vanes.

As an example, vanes may be characterized by solidity. For example, a compressor assembly can include vanes of a front-end diffuser and can include vanes of a rear-end diffuser where the vanes may be characterized by solidity value(s) where such a value or values may be in a range of from approximately 0.5 to approximately 1.0.

As an example, a front-end diffuser may have slightly higher solidity value than a rear-end diffuser. As an example, solidity values may be selected to help delay stall inception and to help increase peak efficiency of a compressor stage with acceptable flow capacity at wide operating conditions.

As an example, a radial gap between leading edges (LEs) of vanes of a front-end vaned diffuser and a compressor wheel face's blade trailing edges (TEs) may be different from a radial gap between leading edges (LEs) of vanes of a rear-end vaned diffuser and another compressor wheel face's blade trailing edges (TEs). For example, the LE location of vanes of a front-end vaned diffuser can be at a radius ratio ($r_3/r_2$) of approximately 1.15 where the LE location of vanes of a rear-end vaned diffuser is at radius ratio of ($r_3/r_2$) of approximately 1.09.

Figure 5:
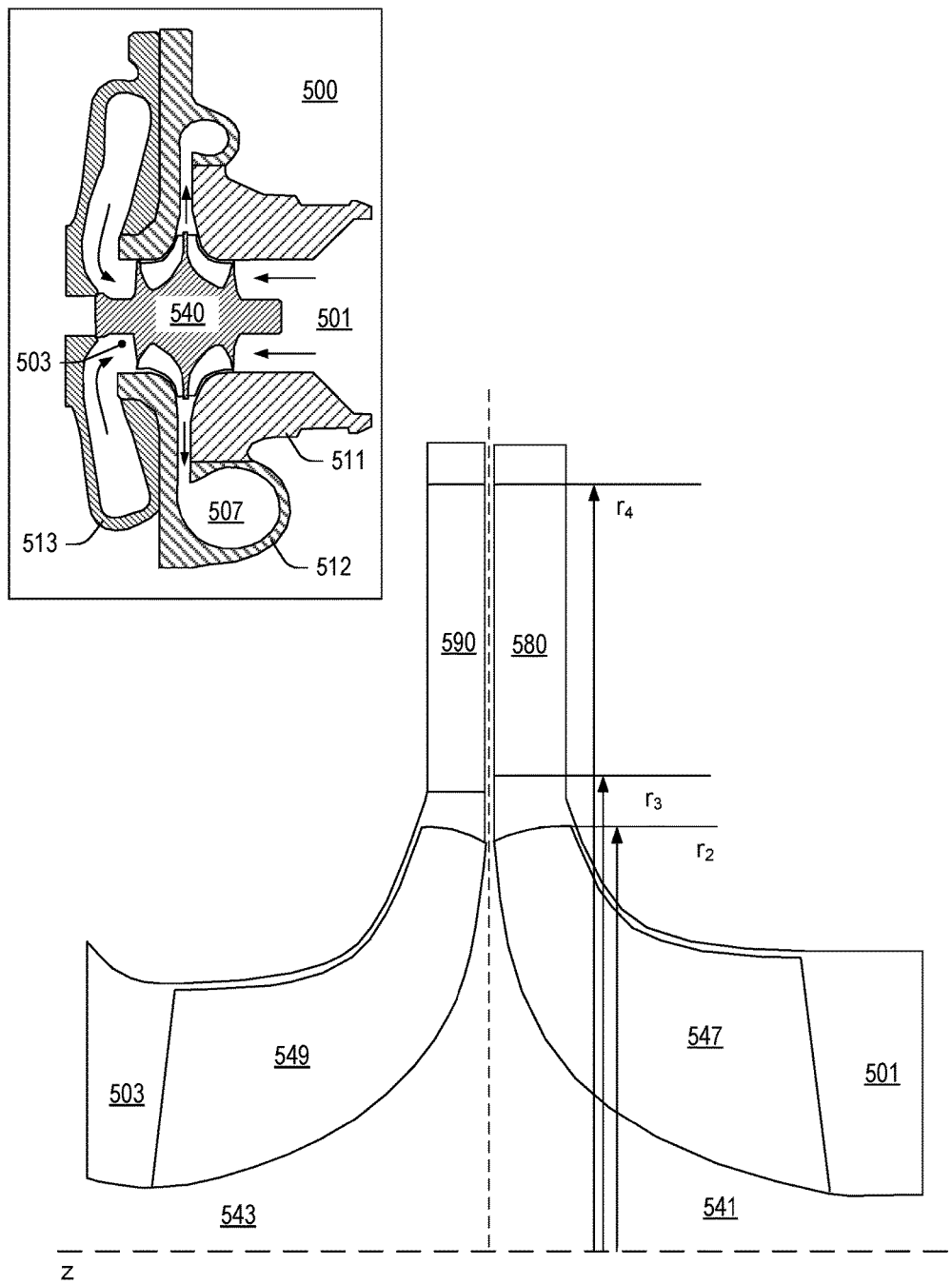
FIG. 5 is a cross-sectional view of an example of a compressor assembly and a schematic of a dual-faced compressor wheel and vanes.

FIG. 5 shows an example of a compressor assembly 500 that includes an inlet 501 and an inlet 503 where the compressor assembly 500 can be formed from multiple components such as, for example, a component 511, a component 512 and a component 513, which may be a conduit component that forms a cavity about the axis of a compressor wheel space for flow of fluid thereto (e.g., a toroidal cavity that directs fluid to the inlet 503).

As shown in the example of FIG. 5, a compressor wheel 540 includes two faces 541 and 543 where the face 541 includes a blade 547 and where the face 543 includes a blade 549. The compressor wheel 540 has a rotational axis, labeled z, from which radial dimensions may be measured. In the example of FIG. 5, radii $r_2$, $r_3$ and $r_4$ are labeled. The radius $r_2$ is a trailing edge (TE) of the blade 547, the radius $r_3$ is the leading edge (LE) of a vane 580 and $r_4$ is a trailing edge (TE) of the vane 580. Corresponding radii may be defined for the blade 549 and the vane 590.

As an example, a radial gap defined by $r_3/r_2$ can be in a range from approximately 1.04 to approximately 1.22 for the frond-end and the rear-end diffuser. As an example, a read-end diffuser can have a radial gap that is less than that of a front-end diffuser. As an example, radius ratios of a vaned diffuser defined by $r_4/r_3$ may be in a range from approximately 1.4 to approximately 1.8.

As an example, vanes of a front-end diffuser may be non-stacked (e.g., 3D), for example, with a LE lean angle up to approximately 20 degrees to enhance aerodynamic performance; while vanes of a rear-end diffuser may be stacked (e.g., 2D), with a LE lean angle of zero, for example, matched for improved surge margin. A non-stacked or 3D vane includes a vane profile (metal angles) and/or thickness that vary between hub to shroud sides of the 3D vane. On the other hand, a stacked or 2D vane includes a vane profile (metal angles) and thickness distribution that do not vary between hub and shroud sides of the 2D vane.

As an example, vanes of a front-end diffuser may also be 2D. As an example, the leading edge angle of a 2D front-end diffuser vane may differ from the leading edge angle of a rear-end diffuser vane.

As an example, the LE shape and angle of each vane of one side of a vaned diffuser may differ from that of another side of the vaned diffuser depending on relative velocity diffusion ratio through a respective impeller face and its corresponding exit flow field.

As an example, the LE shape of vanes of a front-end vaned diffuser may have a 3D lean with a lean angle variation from hub to shroud that may be up to approximately 20 degrees (e.g., consider a lean angle of approximately 10 degrees). As an example, the LE shape of vanes of a rear-end vaned diffuser may be 2D in shape with no lean angle. As an example, the LE shape of vanes of a rear-end vaned diffuser may be 3D in shape with a lean angle variation from hub to shroud sides that may be less than approximately 20 degrees (e.g., consider a lean angle of approximately 5 degrees).

Vanes aerodynamic performance may also be defined in part by stagger angle, which can be defined as $(\beta_{LE}+\beta_{TE})/2$. As an example, vanes may have stagger angles that are in a range from approximately 50 to approximately 70 degrees with respect to a radial direction from an axis of rotation of a compressor wheel. As an example, vanes may be defined in part by an angle determined by 3D shape of a leading edge (LE).

As an example, for an impeller with a higher relative velocity diffusion ratio, absolute flow can become more tangential and thus an associated vane diffuser may be constructed for higher LE blade angle to reduce incidence loss. As an example, to reduce incidence loss at low flow condition, the LE blade angle (with respect to radial direction) of vanes of a rear-end vaned diffuser may be higher than that of vanes of a front-end vaned diffuser. For example, the LE mid-span of a rear-end vaned diffuser vane can be approximately 7.5 degrees higher than that of a front-end vaned diffuser vane.

As an example, in a parallel mode of operation, a front-end impeller face may flow about 5 percent to about 10 percent more compared to a rear-end impeller face due to different inlet flow conditions. As an example, an inlet flow field for a rear-end impeller face may induce higher aerodynamic blockage compared to a front-end impeller face due to flow conduit shape of an inlet to a rear-end impeller face being more obstructive that flow conduit shape of an inlet to a front-end impeller face.

In a single mode of operation (e.g., which may occur during transient or low flow conditions), flow through a front-end impeller face may be about 2.5 times higher than flow through a rear-end impeller face due to stability issues through the read-end impeller region. As an example, flow through a front-end impeller region can be greater than approximately 2.5 times a near stability limit of a compressor assembly.

As an example, a compressor assembly can be constructed to help reduce interaction between two different impeller exit flow fields via a double sided vaned diffuser and a divider that helps to reduce mixing loss and/or aerodynamic blockage, which can help improve stage stability and surge margin. A compressor assembly can include two sets of vanes arranged on a divider where such vanes can help to improve pressure recovery (Cp) and efficiency of a compressor stage due to de-swirling the flow over a smaller flow path in the vaned diffusion system.

Flow leaving a dual-faced impeller can be distorted, unsteady and turbulent, especially at low exit flow rate and near the impeller shroud. A double-sided vaned diffuser can help to improve performance and stability of a dual-faced impeller at low flow conditions, for example, by improving pressure recovery of a compressor assembly's diffusion system and delaying stall inception. Such an approach may improve work input contribution of a rear-end diffuser.

As an example, the LE of vanes of a rear-end diffuser can be slightly more negative incidence at a design point to promote operability range of a centrifugal stage. As an example, the maximum turning angle of a vane may be less than approximately 20 degrees.

Operability range and performance of a vaned diffusion system of a compressor assembly can depend on how diffuser vanes are aligned with respect to a volute tongue leading edge (LE). As an example, a volute tongue LE can be radially aligned with the TE of a front-end diffusion system.

As an example, front-end diffuser vanes and rear-end diffuser vanes may be symmetrically or asymmetrically imposed on each side of the divider to reduce circumferential flow non-uniformity downstream of diffuser (e.g., due to a volute) and its impact on upstream flow characteristics. In such an example, vanes may be more closely spaced near a tongue of a volute as compared to other circumferential locations.

As an example, a dual-sided diffusion system may work with a single or a twin volute system. As to a twin volute system, the volutes may be symmetric or asymmetric depending on characteristics of a respective diffuser exit flow field. As to a twin volute system (e.g., a compressor assembly with two volutes), a properly matched dual-sided diffusion system may further improve pressure recovery and/or stage stability by reducing aerodynamic blockage, circumferential non-uniformity, and mixing losses (e.g., entropy gain) of flow downstream of the diffusion system.

Figure 6:
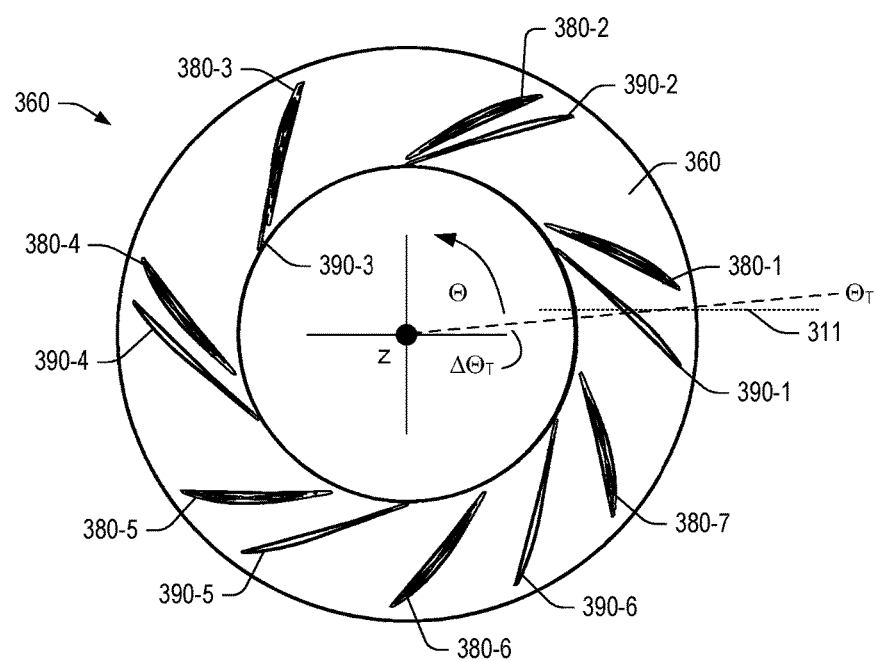
FIG. 6 is a plan view of an example of a diffuser section divider that includes vanes and perspective views of vanes.
Figure 6:
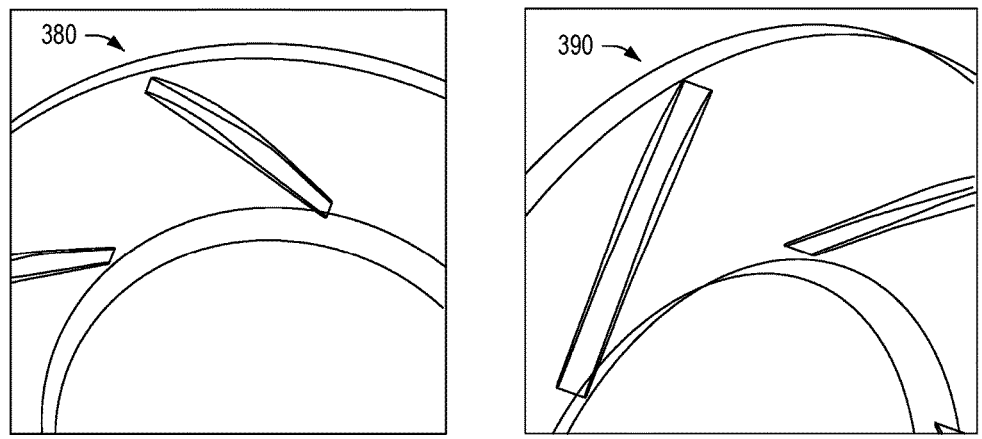

FIG. 6 shows a plan view of the divider 360 that includes the vanes 380 on one side and the vanes 390 on another, opposing side. In the example of FIG. 6, the vanes 380 are front-end or front-side vanes (e.g., associated with the face 341 of the compressor wheel 340) while the vanes 390 are rear-end or rear-side vanes (e.g., associated with the face 343 of the compressor wheel 340). As shown, the vanes 380 include six individual vanes and the vanes 390 include seven individual vanes. The positions of the vanes 380 and the positions of the vanes 390 may be defined with respect to azimuthal angles ($\Theta$) about the z-axis and, for example, with respect to radial dimensions as measured from the z-axis.

FIG. 6 also shows an approximately position of the tongue 311 of the volute 307 along with an approximate tongue angle $\Theta_T$ that may define an offset angle $\Delta\Theta_T$ that may be utilized as to positions of the vanes 380 and/or the vanes 390.

As an example of asymmetric distribution, vanes may be more closely spaced near a tongue of a volute as compared to other circumferential locations (see, e.g., the example divider 360 of FIG. 6, which illustrates positions of two sets of vanes, one set on each side of the divider 360). In the example of FIG. 6, the coordinate system may be utilized to provide positions of the vanes 380 and/or positions of the vanes 390. As shown in the example divider 360 of FIG. 6, the right half of the divider 360 includes positions of the vanes 380-1, 380-2, 380-6 and 380-7; whereas, the left half of the divider 360 includes positions of the vanes 380-3, 380-4 and 380-5 (e.g., four vanes on the tongue half and three vanes on the other half). As to the vanes 390, the right half includes positions of the vanes 390-1, 390-2, and 390-6; whereas, the left half includes positions of the vanes 390-3, 390-4 and 390-5 (e.g., three vanes on the tongue half and three vanes on the other half).

As shown in FIG. 6, throats may be defined by adjacent vanes. For example, the vanes 380-1 and 380-2 define a throat through which compressed gas may be directed from a compressor wheel space to a volute where such compressed gas is predominantly from an exducer portion of a first face of a compressor wheel disposed at least in part in the compressor wheel space; and, the vanes 390-1 and 390-2 define a throat through which compressed gas may be directed from a compressor wheel space to a volute where such compressed gas is predominantly from an exducer portion of a second face of the compressor wheel disposed at least in part in the compressor wheel space.

As an example, an operability range and performance of a vaned diffusion system can depend on how various diffuser vanes are aligned with respect to a scroll tongue's leading edge (LE). In the example of FIG. 6, the scroll tongue LE (see the line labeled 313) is approximately radially aligned with the TE of the front-end diffusion system (see, e.g., the vane 380-1 and its trailing edge (TE)).

As an example, throats defined by vanes of one side of a diffuser section divider can differ from throats defined by vanes of another side of the diffuser section divider. In the example of FIG. 6, the vanes 380 define seven throats while the vanes 390 define six throats.

Diffuser vane sets can be, in general different, with a single volute compressor assembly where the vane sets are matched to their respective impellers (e.g., compressor wheel faces). As an example, in a single volute compressor assembly, the TE shape of a diffuser vane for a diffuser section with a relatively small vaneless space or high exit radial/meridional velocities may have slightly smaller TE thickness/bluntness by making it smoother or aerodynamic to reduce the strength of the downstream wake, aerodynamic blockage, and mixing losses.

FIG. 7 shows examples of vane parameters 710, 722, 724 and 726 and an example of one of the vanes 380 where the vane includes a leading edge (LE) 381 and a trailing edge (TE) 382 as well as a hub side 383 with a hub side profile (solid line) and a shroud side 384 with a shroud side profile (dotted line). The vanes 380 include side surfaces, which may be defined as a suction surface and a pressure surface (e.g., akin to an airfoil). Such side surfaces extend between the LE 381 and TE 382 and the hub side 383 and the shroud side 384.

As to the vane parameters 710, these can include a tip to maximum camber distance "a", a maximum camber "b", a chord length "c", a maximum inter-vane distance or spacing "s", a maximum vane width "t", a throat or inter-vane opening distance "o" and attack angles. The vane parameters 710 are shown with dashed lines that represent camber lines. As mentioned, solidity can be defined as c/s.

As to the vane parameters 722, 724 and 726, these correspond to a sweep angle 722 between a hub side profile and a shroud side profile, a lean angle 724 between a hub side profile and a shroud side profile and a twist angle 726 between a hub side profile and a shroud side profile where the profiles are shown in a two dimensional coordinate system with a Y-axis and an X-axis where vane height would be along a Z-axis.

As to the example vane 380, it is shown as having the hub side 383 and the shroud side 384 as coinciding in X,Y while the body of the vane 380 varies with respect to height (e.g., in the Z direction).

While a vane is a 3D structure, as mentioned, a vane can be referred to as a 2D vane or a 3D vane. A vane profile may be defined in a Cartesian coordinate system with x, y and z dimensions where the vane profile is in an x,y-plane and vane height is along a z-direction. A 3D or a non-stacked vane includes a vane profile (metal angles) and/or thickness that vary between hub to shroud sides of the 3D vane. On the other hand, a 2D or a stacked vane includes a vane profile (metal angles) and thickness distribution that do not vary between hub and shroud sides of the 2D vane.

Figure 8:
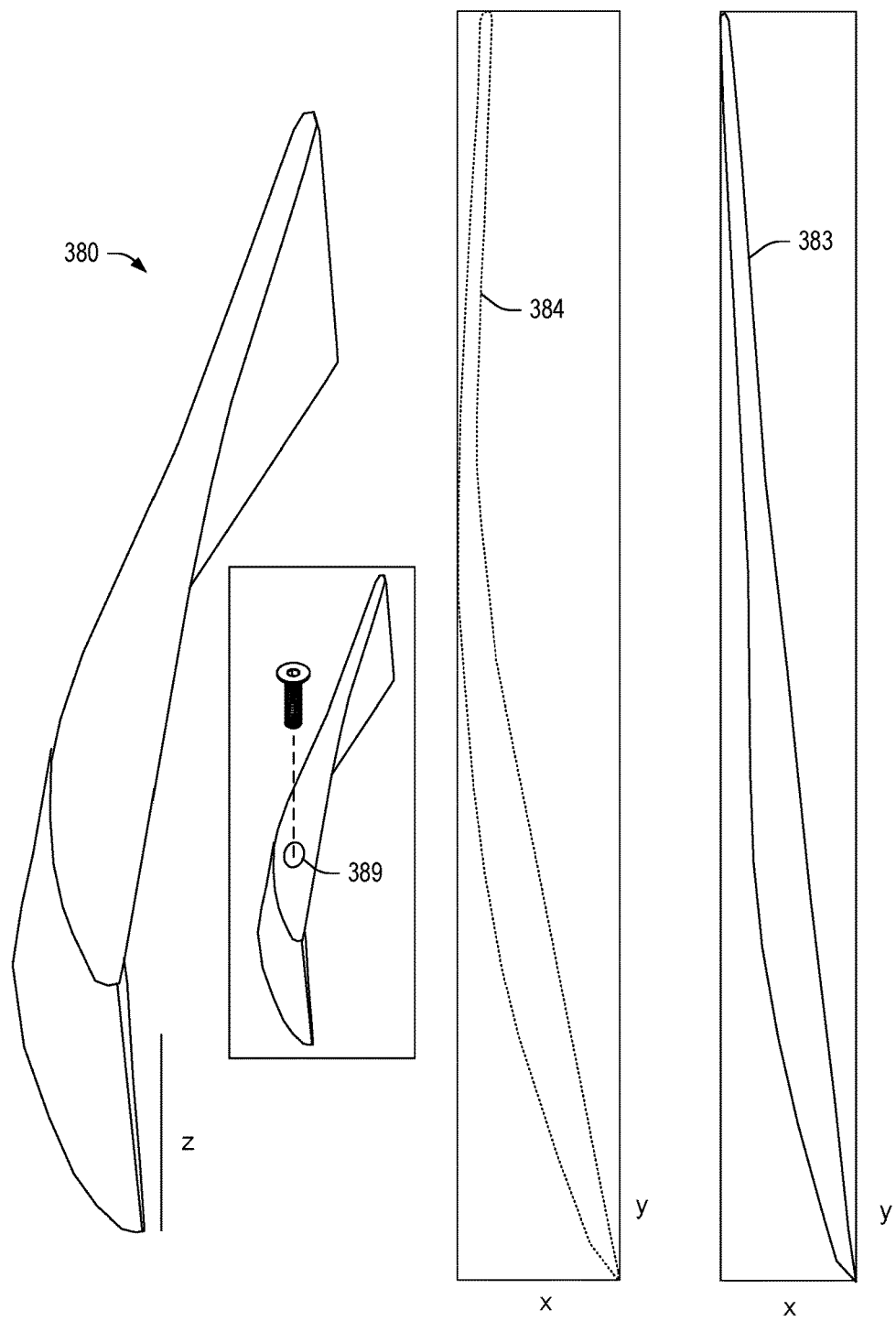
FIG. 8 is a series of views of the non-stacked vane of FIG. 7.

FIG. 8 shows the one of the vanes 380 of FIG. 7 in a perspective view and in plan views with respect to the vane profiles of the hub side 383 and of the shroud side 384. FIG. 8 also shows an example of an optional bore 389 that can be utilized to mount a diffuser section divider to a compressor housing. As an example, a bolt, a screw, etc. may be received at least in part by the bore 389. As an example, a diffuser section divider may include an opening through which a bolt, a screw, etc. may be received and further received by the bore 389 and, for example, yet further received by an opening (e.g., threaded, etc.) of a compressor housing (see, e.g., the compressor housing 310 of FIG. 4).

Figure 9:
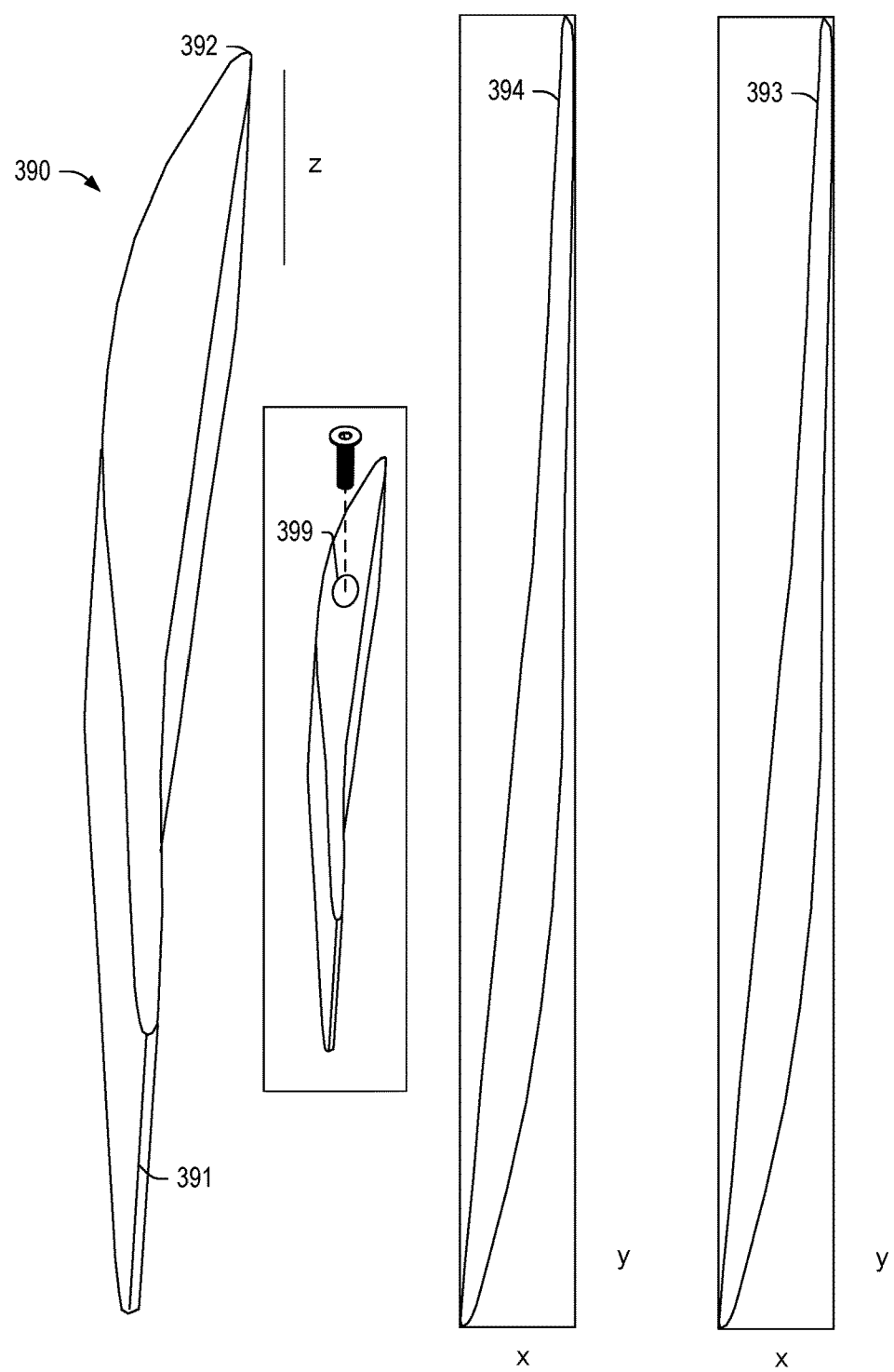
FIG. 9 is a series of views of an example of a stacked vane.

FIG. 9 shows one of the vanes 390 of FIG. 7 in a perspective view and in plan views with respect to the vane profiles of a hub side 393 and of a shroud side 394. In FIG. 9 the one of the vanes 390 includes a leading edge (LE) 391 and a trailing edge (TE) 392 as well as the hub side 393 with a hub side profile and the shroud side 394 with a shroud side profile. The vanes 390 include side surfaces, which may be defined as a suction surface and a pressure surface (e.g., akin to an airfoil). As shown in FIG. 9, such side surfaces extend between the LE 391 and TE 392 and the hub side 393 and the shroud side 394. As an example, a hub side profile of a vane can be the same as a shroud side profile of a vane where such a vane can be a stacked vane (e.g., the profile may be the same along the vane height).

FIG. 9 also shows an example of an optional bore 399 that can be utilized to mount a diffuser section divider to a compressor housing. As an example, a bolt, a screw, etc. may be received at least in part by the bore 399. As an example, a diffuser section divider may include an opening through which a bolt, a screw, etc. may be received and further received by the bore 399 and, for example, yet further received by an opening (e.g., threaded, etc.) of a compressor housing (e.g., the compressor housing component 310 or the compressor housing component 330 of FIG. 3).

Figure 10:
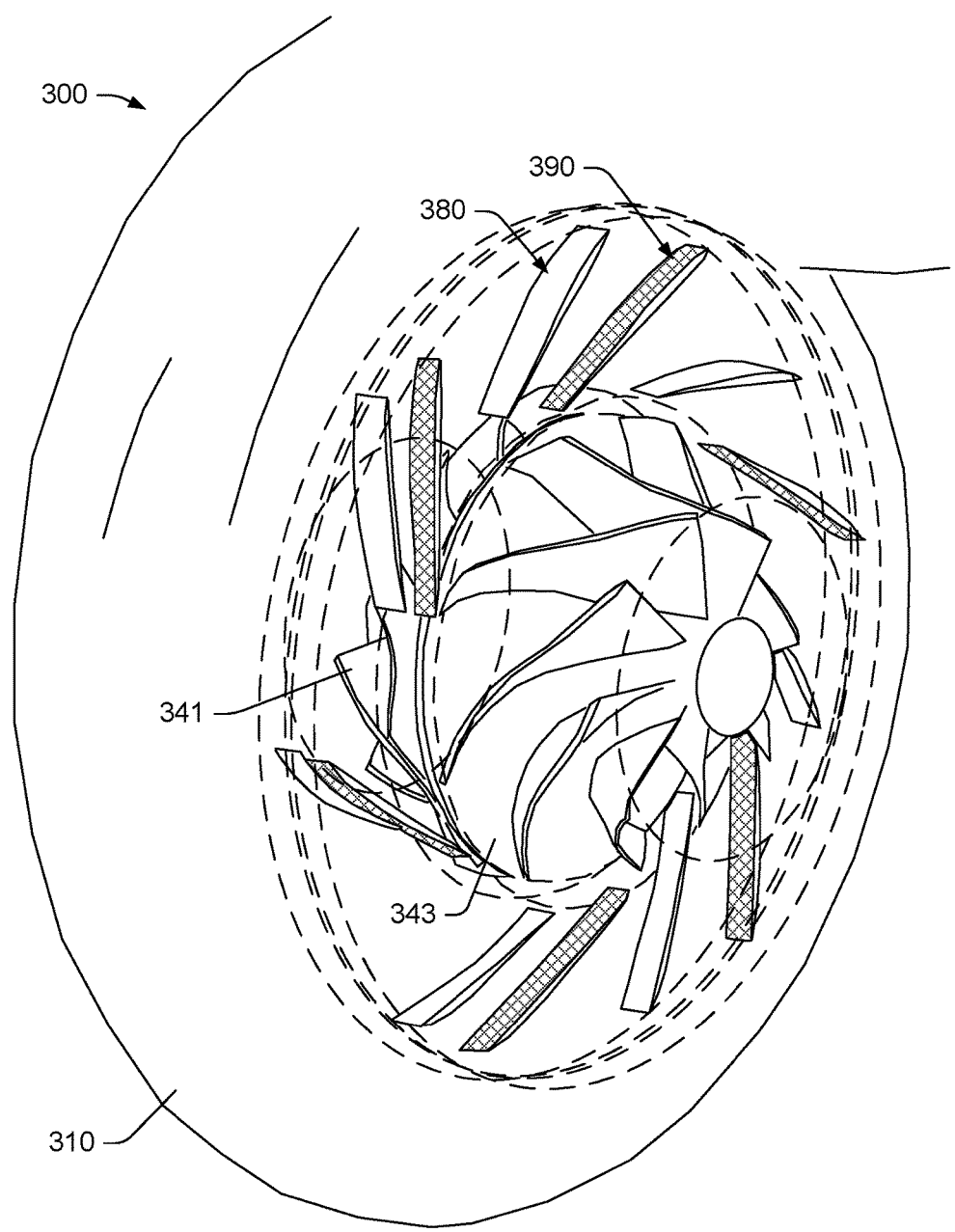
FIG. 10 is an approximate perspective view of the compressor assembly of FIG. 3.

FIG. 10 shows a perspective view of the compressor assembly 300 along with the compressor wheel faces 341 and 343, the vanes 380 and the vanes 390.

Figure 11:
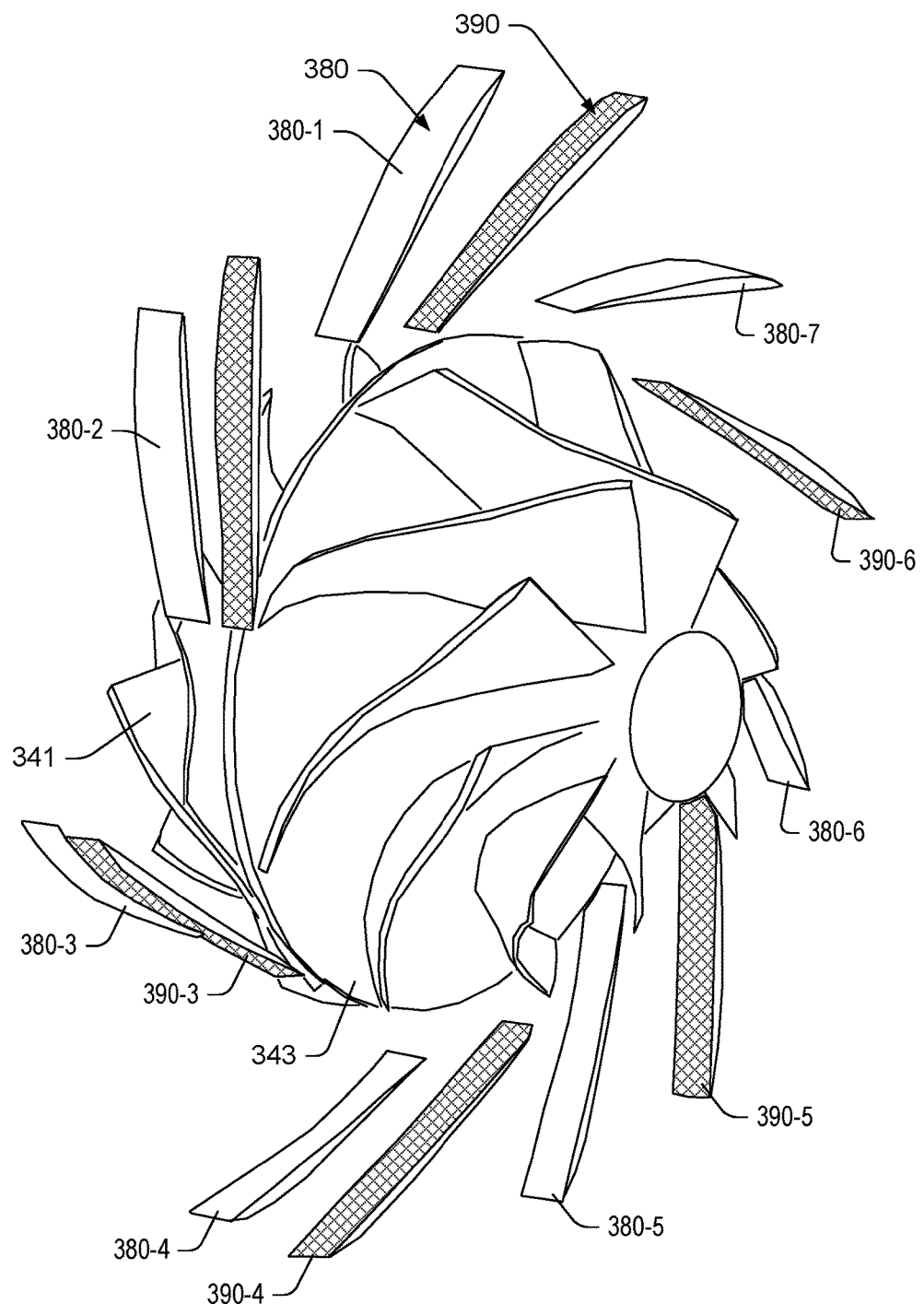
FIG. 11 is an approximate perspective view of a portion of the compressor assembly of FIG. 3.

FIG. 11 shows a perspective view of a portion of the compressor assembly 300 along with the compressor wheel faces 341 and 343, the vanes 380 and the vanes 390. In FIG. 11, the vanes 380 are labeled 380-1 to 380-7 and the vanes 390 are labeled 390-1 to 390-6; noting that the vanes 380 may include a number of vanes that differs from the seven shown and that the vanes 390 may include a number of vanes that differs from the six shown.

FIG. 12 shows an example of a compressor assembly 1200 that includes a dual-faced compressor wheel 1240 that is an assembly of two separate compressor wheels 1241 and 1243 that are mounted to a common turbine shaft 1220. As shown, the face of the compressor wheel 1241 receives fluid via an inlet 1201, which is a first stage inlet, and the face of the compressor wheel 1243 receives fluid via an inlet 1203, which is a second stage inlet. The compressor assembly 1200 includes housing components 1210 and 1230, which can be unitary components or multi-piece components. As shown, the housing components 1210 and 1230 form a compressor housing when assembled where the compressor housing includes a compressor wheel space 1202 disposed between the inlets 1201 and 1203. As shown, the dual-faced compressor wheel 1240 is disposed in the compressor wheel space 1202.

As shown in the example of FIG. 12, the first stage includes a first diffuser 1205-1 and a first stage volute 1207-1 and the second stage includes a second diffuser 1205-2 and a second stage volute 1207-2. The diffuser 1205-1 is defined by a portion of the housing component 1210 and a portion of a divider 1260 and the diffuser 1205-2 is defined by a portion of the housing component 1230 and a portion of the divider 1260.

In the example of FIG. 12, the diffuser 1205-1 includes a set of vanes 1280 and the diffuser 1205-2 includes a set of vanes 1290. The vanes 1280 and the vanes 1290 may be mounted to the divider 1260, which extends from a radius that is less than a maximum radius of the compressor wheel 1241 and that is less than a maximum radius of the compressor wheel 1243. The divider 1260 can be clamped between the housing component 1210 and the housing component 1230, for example, at a portion of the divider 1260 that extends radially outwardly from the diffuser section portion of the divider 1260. As an example, the housing component 1210 may be bolted to the housing component 1230 with a portion of the divider 1260 disposed therebetween to secure the divider 1260. For example, the divider 1260 may be secured via a manner as shown in FIG. 4 and/or the divider 1260 may be secured via a manner as shown in FIG. 12. As an example, the vanes 1280 may be coupled to the housing component 1210 and/or the vanes 1290 may be coupled to the housing component 1230. As an example, some of the vanes 1280 and 1290 may be coupled to one or more of the housing components 1210 and 1230 and/or some of the vanes 1280 and 1290 may be coupled to the divider 1260.

In the example of FIG. 12, the compressor assembly 1200 can be defined by a front-end and a rear-end where the inlet 1201 is a front-end inlet, the diffuser 1205-1 is a front-end diffuser and the volute 1207-1 is a front-end volute; and where the inlet 1203 is a rear-end inlet, the diffuser 1205-2 is a rear-end diffuser and the volute 1207-2 is a rear-end volute. In FIG. 12, dimensions $r_2$, $r_d$, $r_3$, $r_4$ and $r_5$ are shown for the front-end and for the rear-end.

As shown in FIG. 12, the compressor assembly 1200 includes twin volutes 1207-1 and 1207-2 that can be asymmetric as their aerodynamic design and matching depends on the respective diffuser shape and exit flow field characteristics (e.g., velocities and flow angles) to minimize total pressure loss and induced distortion at diffuser exit.

Diffuser shape and flow characteristics have an impact on the aerodynamic design and performance of a corresponding volute. For example, diffuser vanes with high radius ratios or high exit radial/meridional velocities may be utilized with slightly higher vaneless space downstream of the diffuser exit to minimize induced distortion at the diffuser exit and for stable operation at low flow rates (e.g., where a two-stage compressor assembly may operate beneficially at low flow).

In the example of FIG. 12, the compressor wheels 1241 and 1243 differ in size, where the front-end compressor wheel 1241 is larger and corresponds to a low-pressure stage while the rear-end compressor wheel 1243 is smaller and corresponds to a high-pressure stage. As shown in FIG. 12, the diffuser 1205-1 for the low pressure stage is sized slightly bigger (e.g., as to throat area) when compared to the diffuser 1205-2 for the high pressure stage. As an example, as to vanes 1280 and 1290, solidity of the low pressure diffuser 1205-1 can be smaller when compared to solidity of the high pressure stage diffuser 1205-2.

Front-end or low pressure stage diffuser inlet radius ratio $r_3/r_2$ (diffuser LE to compressor wheel 1241 blade TE) may be higher than rear-end diffuser inlet radius ratio (diffuser LE to compressor wheel 1243 blade TE).

As to $A_t/A_c$ (throat to capture) of the front-end diffuser 1205-1, it may be higher than that of the rear-end diffuser 1205-2. The solidity or number of vanes of the low pressure diffuser 1205-1 may be smaller when compared to number of vanes of the high pressure diffuser 1205-2.

As to dimensions $r_4$ and $r_5$, a ratio $r_5/r_4$ (volute inlet to diffuser TE radius ratio) may be smaller for the low pressure (front-end) stage as compared to the high pressure (read-end) stage.

The compressor assembly 1200 is shown as a compressor assembly of a turbocharger (see, e.g., the turbocharger 120 of FIG. 1) where the compressor assembly 1200 includes a compressor housing (e.g., a multi-component compressor housing that includes the housing components 1210 and 1230) that includes the compressor wheel space 1202 and a diffuser section that extends from the compressor wheel space 1202 to at least one volute 1207-1 and 1207-2; the dual-faced compressor wheel 1240 disposed at least in part in the compressor wheel space 1202 where the dual-faced compressor wheel 1240 includes the first compressor wheel face 1241 and the second compressor wheel face 1243 oriented back-to-back; and the diffuser section divider 1260 disposed at least in part in the diffuser section where the diffuser section divider 1260 includes a first side that defines the first diffuser 1205-1 that includes the first set of vanes 1280 associated with the first compressor wheel face 1241 and a second side that defines the second diffuser 1205-2 that includes the second set of vanes 1290 associated with the second compressor wheel face 1243.

As an example, a compressor assembly of a turbocharger can include a compressor housing that includes a compressor wheel space and a diffuser section that extends from the compressor wheel space to at least one volute; a dual-faced compressor wheel disposed at least in part in the compressor wheel space where the dual-faced compressor wheel includes a first compressor wheel face and a second compressor wheel face oriented back-to-back; and a diffuser section divider disposed at least in part in the diffuser section where the diffuser section divider includes a first side that defines a first diffuser that includes a first set of vanes associated with the first compressor wheel face and a second side that defines a second diffuser that includes a second set of vanes associated with the second compressor wheel face. In such an example, the first set of vanes can differ from the second set of vanes with respect to number of vanes. For example, the first set of vanes can differ from the second set of vanes with respect to vane shape. As to vane shape, the vane shape of the first set of vanes can be a non-stacked shape and the vane shape of the second set of vanes can be a stacked shape.

As to number of vanes in a vane set, as an example, a first set of vanes can include at least five vanes and a second set of vanes can include at least five vanes. As an example, the number of vanes in a first set of vanes can differ from the number of vanes in a second set of vanes. Such a difference in number of vanes can be related to flow to a first face of a dual-faced compressor wheel being different than flow to a second face of the dual-faced compressor wheel.

The number of vanes in a set of vanes can determine spacing between vanes, which may be, for example, an average spacing that may be approximated by the number of vanes divided by 360 degrees. As mentioned, solidity is a parameter that depends on the parameter "s", which, as shown in FIG. 7, is a vane spacing parameter. Solidity also depends on chord length, which is represented as the parameter "c" in FIG. 7. As shown in FIG. 6, vanes in a set of vanes may be unevenly spaced where spacing may depend on location of a tongue (see, e.g., $\Theta_T$ in FIG. 6). For example, on a tongue half of a divider, vanes may be more closely spaced than on a non-tongue half of the divider. As an example, an average vane spacing on a tongue half of a divider may be less than an average vane spacing on a non-tongue half of the divider. As an example, vane spacing, which may be average vane spacing, may differ for vanes on a front-end side of a divider when compared to vanes on a rear-end side of the divider.

As an example, a dual-faced compressor wheel can include a nose where a first compressor wheel face includes an outwardly directed face, with respect to a turbine end of a shaft, that extends to the nose (e.g., a compressor wheel face that includes a nose) and such a dual-faced compressor wheel can include a socket where a second compressor wheel face that includes an inwardly directed face, with respect to the turbine end of the shaft, that extends to the socket.

As an example, a compressor housing can be a multi-piece compressor housing. For example, FIG. 3 shows housing components 310 and 330 and FIG. 5 shows components 511, 512 and 513, which may be considered to be housing components. As an example, a multi-piece compressor housing can include a first inlet to a first compressor wheel face and a second inlet to a second compressor wheel face where, for example, the first inlet has a shape that differs from a shape of the second inlet. As an example, a first inlet may be in fluid communication with a substantially cylindrical conduit with an axis aligned with an axis of rotation of a dual-faced compressor wheel while a second inlet may be in fluid communication with a conduit that includes a toroidal shape where fluid flows in a first axial direction and then turns to flow in a second axial direction that is aligned with the axis of rotation of the dual-faced compressor wheel.

As an example, diffuser section divider can include a leading edge and a trailing edge. In such an example, flow can be split at the leading edge such that a portion of the flow is directed to a first diffuser and another portion of the flow is directed to a second diffuser. In such an example, the first diffuser and the second diffuser may direct flow to a common volute or, for example, to two different volutes. Where the an assembly includes two volutes, the trailing edge may be received by or contact a component or components to segregate fluid to flow, to one side of the diffuser section divider in the first diffuser, to a first volute and, to another side of the diffuser section divider in the second diffuser, to a second volute. Where an assembly includes a single, common volute, at the trailing edge of the diffuser section divider, flows from the first diffuser and the second diffuser may contact and mix, for example, to form a vortex in the single, common volute.

As an example, at least one vane of a set of vanes can include a mounting bore for mounting a diffuser section divider to a compressor housing. For example, a vane can include a through bore as a mounting bore for receipt of a bolt that can be received by a threaded bore of a compressor housing component. In such an arrangement, the bolt can pass through the diffuser section divider (e.g., via an opening) and through the vane, via the mounting bore, and at least partially into a threaded bore of the compressor housing component to secure the diffuser section divider with respect to the compressor housing.

As an example, a diffuser section of a compressor assembly can include substantially parallel walls. As an example, a diffuser section may be defined by a region that has substantially parallel walls. As an example, a compressor assembly can include walls that taper to a region that has substantially parallel walls. Such walls that taper can be walls that define, at least in part, a compressor wheel space for a dual-faced compressor wheel.

As an example, a dual-faced compressor wheel can include a socket that receives a shaft where the shaft is coupled to a turbine wheel. For example, the shaft may be a shaft and turbine wheel assembly (SWA) where the turbine wheel is welded to the shaft. Such a shaft can include a compressor end where a dual-faced compressor wheel can receive at least a portion of the compressor end of the shaft. As an example, a dual-faced compressor wheel can include a partial bore that receives a portion of a shaft of an SWA or, for example, a dual-faced compressor wheel can include a through bore that receives a portion of a shaft of an SWA.

As an example, compressor assembly can include a low-pressure stage volute and a high pressure stage volute, where a first compressor wheel face and a first set of vanes are associated with the low-pressure stage and where a second compressor wheel face and a second set of vanes are associated with the high-pressure stage volute. As an example, a dual-faced compressor wheel can include two separate compressor wheels (see, e.g., the dual-faced compressor wheel 1240 of FIG. 12).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A compressor assembly of a turbocharger, the compressor assembly comprising:
a compressor housing that comprises a compressor wheel space and a diffuser section that extends from the compressor wheel space to at least one volute;
a dual-faced compressor wheel disposed at least in part in the compressor wheel space wherein the dual-faced compressor wheel comprises a first compressor wheel face and a second compressor wheel face oriented back-to-back; and
a diffuser section divider disposed at least in part in the diffuser section wherein the diffuser section divider comprises a first side that defines a first diffuser that comprises a first set of vanes associated with the first compressor wheel face and a second side that defines a second diffuser that comprises a second set of vanes associated with the second compressor wheel face, wherein each of the vanes of the first set of vanes comprises a leading edge lean angle that exceeds a leading edge lean angle of each of the vanes of the second set of vanes.

2. The compressor assembly of claim 1 wherein the first set of vanes differs from the second set of vanes with respect to number of vanes.

3. The compressor assembly of claim 1 wherein the first set of vanes differs from the second set of vanes with respect to vane shape.

4. The compressor assembly of claim 3 wherein the vane shape of the first set of vanes comprises a non-stacked shape and wherein the vane shape of the second set of vanes comprises a stacked shape.

5. The compressor assembly of claim 1 wherein the first set of vanes comprises at least five vanes.

6. The compressor assembly of claim 1 wherein the second set of vanes comprises at least five vanes.

7. The compressor assembly of claim 1 wherein the dual-faced compressor wheel comprises a nose and wherein the first compressor wheel face comprises an outwardly directed face that extends to the nose.

8. The compressor assembly of claim 1 wherein the dual-faced compressor wheel comprises a socket and wherein the second compressor wheel face comprises an inwardly directed face that extends to the socket.

9. The compressor assembly of claim 1 wherein the compressor housing comprises a multi-piece compressor housing.

10. The compressor assembly of claim 9 wherein the multi-piece compressor housing comprises a first inlet to the first compressor wheel face and a second inlet to the second compressor wheel face.

11. The compressor assembly of claim 10 wherein the first inlet comprises a shape that differs from a shape of the second inlet.

12. The compressor assembly of claim 1 wherein the diffuser section divider comprises a leading edge and a trailing edge.

13. The compressor assembly of claim 1 wherein at least one of the vanes comprises a mounting bore for mounting the diffuser section divider to the compressor housing.

14. The compressor assembly of claim 1 wherein the diffuser section comprises substantially parallel walls.

15. The compressor assembly of claim 1 wherein the dual-faced compressor wheel comprises a socket that receives a shaft wherein the shaft is coupled to a turbine wheel.

16. The compressor assembly of claim 1 comprising a low-pressure stage volute and a high pressure stage volute, wherein the first compressor wheel face and the first set of vanes are associated with the low-pressure stage and wherein the second compressor wheel face and the second set of vanes are associated with the high-pressure stage volute.

17. The compressor assembly of claim 1 wherein the dual-faced compressor wheel comprises two separate compressor wheels.

18. The compressor assembly of claim 1 wherein the first set of vanes of the first diffuser comprises a solidity that exceeds a solidity of the second set of vanes of the second diffuser, wherein solidity is defined as vane chord length between a vane leading edge (LE) and a vane trailing edge (TE) divided by vane spacing wherein vane spacing is defined by $2\pi 8\,(\text{radius}_{LE}+\text{radius}_{TE})/2]$ divided by a number of vanes of a corresponding diffuser.

19. A compressor assembly of a turbocharger, the compressor assembly comprising:
a compressor housing that comprises a compressor wheel space and a diffuser section that extends from the compressor wheel space to at least one volute;
a dual-faced compressor wheel disposed at least in part in the compressor wheel space wherein the dual-faced compressor wheel comprises a first compressor wheel face and a second compressor wheel face oriented back-to-back; and
a diffuser section divider disposed at least in part in the diffuser section wherein the diffuser section divider comprises a first side that defines a first diffuser that comprises a first set of vanes associated with the first compressor wheel face and a second side that defines a second diffuser that comprises a second set of vanes associated with the second compressor wheel face, wherein the first set of vanes of the first diffuser comprises a solidity that exceeds a solidity of the second set of vanes of the second diffuser, wherein solidity is defined as vane chord length divided by vane spacing.

* * * * *